(12) United States Patent
Hall et al.

(10) Patent No.: US 12,153,723 B2
(45) Date of Patent: Nov. 26, 2024

(54) SYSTEMS AND METHODS FOR LAYERED VIRTUAL FEATURES IN AN AMUSEMENT PARK ENVIRONMENT

(71) Applicant: Universal City Studios LLC, Universal City, CA (US)

(72) Inventors: Gregory Shellman Hall, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/786,359

(22) Filed: Oct. 17, 2017

(65) Prior Publication Data

US 2018/0255285 A1 Sep. 6, 2018

Related U.S. Application Data

(60) Provisional application No. 62/467,817, filed on Mar. 6, 2017.

(51) Int. Cl.
*G06F 3/01* (2006.01)
*A63F 13/211* (2014.01)
(Continued)

(52) U.S. Cl.
CPC ............ *G06F 3/011* (2013.01); *A63F 13/211* (2014.09); *A63F 13/213* (2014.09);
(Continued)

(58) Field of Classification Search
None
See application file for complete search history.

(56) References Cited

U.S. PATENT DOCUMENTS 5,844,530 A 12/1998 Tosaki
5,900,849 A 5/1999 Gallery
(Continued)

FOREIGN PATENT DOCUMENTS

EP 2138213 A1 12/2009
EP 2189200 A1 5/2010
(Continued)

OTHER PUBLICATIONS

Fred H. Previc et al: "Spatial Disorientation in Aviation, vol. 203 of Progress in astronautics and aeronautics", p. 476, XP055489810, Jan. 1, 2004.
(Continued)

*Primary Examiner* — Saptarshi Mazumder
(74) *Attorney, Agent, or Firm* — Fletcher Yoder, P.C.

(57) ABSTRACT

A system for providing an augmented reality, a virtual reality, and/or a mixed reality experience to a user includes a first display and a second display. The user views a real-world environment through the first display and the second display. The system includes a wearable visualization device that includes the first display and a fixed visualization device that includes the second display. The first display is configured to display a first layer of virtual features and the second display is configured to display a second layer of virtual features. The system includes a processor configured to generate the first layer of virtual features and the second layer of virtual features. The processor is configured to operatively communicate with the wearable visualization device and the fixed visualization device to coordinate presentation of the first layer of virtual features and the second layer of virtual features.

19 Claims, 6 Drawing Sheets

(51) Int. Cl.

| | | |
|---|---|---|
| *A63F 13/213* | (2014.01) | |
| *A63F 13/245* | (2014.01) | |
| *A63F 13/25* | (2014.01) | |
| *A63F 13/26* | (2014.01) | |
| *A63F 13/30* | (2014.01) | |
| *A63F 13/355* | (2014.01) | |
| *A63F 13/5255* | (2014.01) | |
| *A63F 13/837* | (2014.01) | |
| *A63F 13/843* | (2014.01) | |
| *A63G 7/00* | (2006.01) | |
| *A63G 27/00* | (2006.01) | |
| *A63G 31/00* | (2006.01) | |
| *A63G 31/16* | (2006.01) | |
| *G02B 27/01* | (2006.01) | |
| *G06F 1/16* | (2006.01) | |
| *G06F 3/04845* | (2022.01) | |
| *G06T 19/00* | (2011.01) | |
| *H04N 13/344* | (2018.01) | |
| *G06F 3/04815* | (2022.01) | |

(52) U.S. Cl.
CPC ............ *A63F 13/245* (2014.09); *A63F 13/25* (2014.09); *A63F 13/26* (2014.09); *A63F 13/30* (2014.09); *A63F 13/355* (2014.09); *A63F 13/5255* (2014.09); *A63F 13/837* (2014.09); *A63F 13/843* (2014.09); *A63G 7/00* (2013.01); *A63G 27/00* (2013.01); *A63G 31/00* (2013.01); *A63G 31/16* (2013.01); *G02B 27/0101* (2013.01); *G02B 27/017* (2013.01); *G02B 27/0172* (2013.01); *G06F 1/163* (2013.01); *G06F 3/012* (2013.01); *G06F 3/04845* (2013.01); *G06T 19/006* (2013.01); *H04N 13/344* (2018.05); *A63F 2300/6653* (2013.01); *G02B 2027/0138* (2013.01); *G02B 2027/014* (2013.01); *G02B 2027/0141* (2013.01); *G02B 2027/0145* (2013.01); *G02B 2027/0178* (2013.01); *G06F 3/04815* (2013.01); *G06F 2203/04806* (2013.01); *G06T 2219/024* (2013.01)

(56) References Cited

U.S. PATENT DOCUMENTS

| | | | |
|---|---|---|---|
| 6,179,619 B1 | 1/2001 | Tanaka | |
| 6,220,965 B1 | 4/2001 | Hanna et al. | |
| 6,462,769 B1 | 10/2002 | Trowbridge et al. | |
| 6,533,670 B1 | 3/2003 | Drobnis | |
| 6,606,953 B2 | 8/2003 | Mares | |
| 6,796,908 B2 | 9/2004 | Weston | |
| 7,495,638 B2 | 2/2009 | Lamvik et al. | |
| 7,955,168 B2 | 6/2011 | Mendelsohn et al. | |
| 8,025,581 B2 | 9/2011 | Bryan et al. | |
| 8,066,576 B2 | 11/2011 | Threlkel | |
| 8,212,859 B2 | 7/2012 | Tang et al. | |
| 8,491,403 B2 | 7/2013 | Schreibfeder | |
| 8,511,827 B2 | 8/2013 | Hua et al. | |
| 8,576,276 B2 | 11/2013 | Bar-Zeev et al. | |
| 8,705,177 B1 | 4/2014 | Miao | |
| 8,767,014 B2 | 7/2014 | Vaught et al. | |
| 8,810,482 B2 | 8/2014 | Abdollahi et al. | |
| 8,867,139 B2 | 10/2014 | Gupta | |
| 8,894,492 B2 | 11/2014 | Ackley et al. | |
| 8,941,559 B2 | 1/2015 | Bar-Zeev et al. | |
| 9,052,505 B2 | 6/2015 | Cheng et al. | |
| 9,092,953 B1 | 7/2015 | Mortimer et al. | |
| 9,155,971 B1 | 10/2015 | Trowbridge | |
| 9,253,524 B2 | 2/2016 | Kaburlasos et al. | |
| 9,266,028 B2 | 2/2016 | Alfieri et al. | |
| 9,268,138 B2 | 2/2016 | Shimizu et al. | |
| 9,285,871 B2 | 3/2016 | Geisner et al. | |
| 9,286,730 B2 | 3/2016 | Bar-Zeev et al. | |
| 9,292,973 B2 | 3/2016 | Bar-Zeev et al. | |
| 9,310,591 B2 | 4/2016 | Hua et al. | |
| 9,316,834 B2 | 4/2016 | Makino et al. | |
| 9,342,610 B2 | 5/2016 | Liu et al. | |
| 9,354,446 B2 | 5/2016 | Abdollahi et al. | |
| 9,360,671 B1 | 6/2016 | Zhou | |
| 9,366,870 B2 | 6/2016 | Cheng et al. | |
| 9,366,871 B2 | 6/2016 | Ghosh et al. | |
| 9,383,582 B2 | 7/2016 | Tang et al. | |
| 9,389,423 B2 | 7/2016 | Bhardwaj et al. | |
| 9,395,811 B2 | 7/2016 | Vaught et al. | |
| 9,454,010 B1 | 9/2016 | Passmore et al. | |
| 9,497,501 B2 | 11/2016 | Mount et al. | |
| 9,519,144 B2 | 12/2016 | Lanman et al. | |
| 9,569,886 B2 | 2/2017 | Akenine-Moller et al. | |
| 9,582,922 B2 | 2/2017 | Lanman et al. | |
| 9,588,341 B2 | 3/2017 | Bar-Zeev et al. | |
| 9,606,362 B2 | 3/2017 | Passmore et al. | |
| 9,638,921 B2 | 5/2017 | Miller et al. | |
| 9,658,460 B2 | 5/2017 | Lee et al. | |
| 9,690,371 B2 | 6/2017 | Salto | |
| 9,690,374 B2 | 6/2017 | Clement et al. | |
| 9,690,375 B2 | 6/2017 | Blum et al. | |
| 9,733,477 B2 | 8/2017 | Gupta | |
| 9,733,480 B2 | 8/2017 | Baek et al. | |
| 9,733,481 B2 | 8/2017 | Carollo et al. | |
| 9,741,125 B2 | 8/2017 | Baruch et al. | |
| 9,763,342 B2 | 9/2017 | Long et al. | |
| 9,778,467 B1 | 10/2017 | White et al. | |
| 9,839,857 B2 | 12/2017 | Wagner | |
| 9,864,406 B2 | 1/2018 | Miller et al. | |
| 9,869,862 B2 | 1/2018 | Cheng et al. | |
| 9,874,749 B2 | 1/2018 | Bradski et al. | |
| 9,877,016 B2 | 1/2018 | Esteban et al. | |
| 9,885,871 B2 | 2/2018 | Abdollahi et al. | |
| 9,933,624 B1 | 4/2018 | White et al. | |
| 10,078,917 B1 * | 9/2018 | Gaeta | G06T 19/006 |
| 2003/0210832 A1 | 11/2003 | Benton | |
| 2006/0250322 A1 | 11/2006 | Hall et al. | |
| 2006/0293110 A1 | 12/2006 | Mendelsohn | |
| 2007/0106484 A1 | 5/2007 | Sweatman et al. | |
| 2008/0188318 A1 | 8/2008 | Piccionelli et al. | |
| 2010/0131865 A1 | 5/2010 | Ackley et al. | |
| 2011/0025584 A1 * | 2/2011 | Nishigasako | G02B 27/01 |
| | | | 345/76 |
| 2011/0141246 A1 | 6/2011 | Schwartz et al. | |
| 2011/0242134 A1 | 10/2011 | Miller et al. | |
| 2012/0206452 A1 | 8/2012 | Geisner et al. | |
| 2012/0320100 A1 | 12/2012 | Machida et al. | |
| 2013/0016123 A1 | 1/2013 | Skarulis | |
| 2013/0032053 A1 | 2/2013 | Stoker | |
| 2013/0130813 A1 * | 5/2013 | Ackley | A63G 7/00 |
| | | | 472/61 |
| 2013/0137076 A1 | 5/2013 | Perez et al. | |
| 2013/0141419 A1 | 6/2013 | Mount et al. | |
| 2013/0244801 A1 | 9/2013 | Frolov | |
| 2013/0307842 A1 | 11/2013 | Grinberg et al. | |
| 2014/0118829 A1 | 5/2014 | Ma et al. | |
| 2014/0132484 A1 | 5/2014 | Pandey et al. | |
| 2014/0146394 A1 | 5/2014 | Tout et al. | |
| 2014/0313189 A1 | 10/2014 | Dominic et al. | |
| 2014/0364208 A1 | 12/2014 | Perry | |
| 2014/0364209 A1 | 12/2014 | Perry | |
| 2014/0364212 A1 | 12/2014 | Osman et al. | |
| 2015/0003819 A1 | 1/2015 | Ackerman et al. | |
| 2015/0090242 A1 | 4/2015 | Weston et al. | |
| 2015/0097863 A1 | 4/2015 | Alaniz et al. | |
| 2015/0097864 A1 * | 4/2015 | Alaniz | G06T 19/006 |
| | | | 345/633 |
| 2015/0100179 A1 | 4/2015 | Alaniz et al. | |
| 2015/0103152 A1 | 4/2015 | Qin | |
| 2015/0190726 A1 | 7/2015 | Frolov | |
| 2015/0273989 A1 | 10/2015 | Momot | |
| 2015/0312561 A1 | 10/2015 | Hoof et al. | |
| 2015/0363976 A1 | 12/2015 | Henson | |
| 2016/0048203 A1 * | 2/2016 | Blum | G06F 3/012 |
| | | | 104/84 |

(56) References Cited

U.S. PATENT DOCUMENTS

| | | |
|---|---|---|
| 2016/0062454 A1 | 3/2016 | Wang et al. |
| 2016/0089610 A1 | 3/2016 | Boyle et al. |
| 2016/0097929 A1 | 4/2016 | Yee et al. |
| 2016/0097930 A1 | 4/2016 | Robbins et al. |
| 2016/0098095 A1 | 4/2016 | Gonzalez-Banos et al. |
| 2016/0171779 A1 | 6/2016 | Bar-Zeev et al. |
| 2016/0188943 A1 | 6/2016 | Franz |
| 2016/0196694 A1 | 7/2016 | Lindeman |
| 2016/0210784 A1 | 7/2016 | Ramsby et al. |
| 2016/0240013 A1 | 8/2016 | Spitzer |
| 2016/0283081 A1 | 9/2016 | Johnston et al. |
| 2016/0314624 A1 | 10/2016 | Li et al. |
| 2016/0343173 A1 | 11/2016 | Mullins |
| 2016/0346704 A1 | 12/2016 | Wagner |
| 2016/0349509 A1 | 12/2016 | Lanier et al. |
| 2016/0353089 A1 | 12/2016 | Gallup et al. |
| 2016/0364907 A1 | 12/2016 | Schoenberg |
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0039986 A1 | 2/2017 | Lanier et al. |
| 2017/0053445 A1 | 2/2017 | Chen et al. |
| 2017/0053446 A1 | 2/2017 | Chen et al. |
| 2017/0053447 A1 | 2/2017 | Chen et al. |
| 2017/0059831 A1 | 3/2017 | Hua et al. |
| 2017/0116950 A1 | 4/2017 | Onal |
| 2017/0131581 A1 | 5/2017 | Pletenetskyy |
| 2017/0136346 A1 | 5/2017 | Wang |
| 2017/0171538 A1 | 6/2017 | Bell et al. |
| 2017/0176747 A1 | 6/2017 | Vallius et al. |
| 2017/0178408 A1 | 6/2017 | Bavor, Jr. et al. |
| 2017/0193679 A1 | 7/2017 | Wu et al. |
| 2017/0208318 A1 | 7/2017 | Passmore et al. |
| 2017/0212717 A1 | 7/2017 | Zhang |
| 2017/0220134 A1 | 8/2017 | Burns |
| 2017/0221264 A1 | 8/2017 | Perry |
| 2017/0236332 A1 | 8/2017 | Kipman et al. |
| 2017/0242249 A1 | 8/2017 | Wall et al. |
| 2017/0255011 A1 | 9/2017 | Son et al. |
| 2017/0262046 A1 | 9/2017 | Clement et al. |
| 2017/0262047 A1 | 9/2017 | Saito |
| 2017/0270841 A1 | 9/2017 | An et al. |
| 2017/0277256 A1 | 9/2017 | Burns et al. |
| 2017/0285344 A1 | 10/2017 | Benko et al. |
| 2017/0293144 A1 | 10/2017 | Cakmakci et al. |
| 2017/0316607 A1 | 11/2017 | Khalid et al. |
| 2017/0323416 A1 | 11/2017 | Finnila |
| 2017/0323482 A1 | 11/2017 | Coup et al. |
| 2017/0336863 A1 | 11/2017 | Tilton et al. |
| 2017/0337737 A1 | 11/2017 | Edwards et al. |
| 2017/0345198 A1 | 11/2017 | Magpuri et al. |
| 2017/0358252 A1* | 12/2017 | Bhageria ............. G09G 3/2003 |
| 2017/0363872 A1 | 12/2017 | Border et al. |
| 2017/0363949 A1 | 12/2017 | Valente et al. |
| 2017/0364145 A1 | 12/2017 | Blum et al. |
| 2018/0003962 A1 | 1/2018 | Urey et al. |
| 2018/0018515 A1 | 1/2018 | Spizhevoy et al. |
| 2018/0024370 A1 | 1/2018 | Carollo et al. |
| 2018/0032101 A1 | 2/2018 | Jiang |
| 2018/0033199 A9 | 2/2018 | Eatedali et al. |
| 2018/0059715 A1 | 3/2018 | Chen et al. |
| 2018/0059776 A1 | 3/2018 | Jiang et al. |
| 2018/0095498 A1 | 4/2018 | Raffle et al. |
| 2018/0104601 A1 | 4/2018 | Wagner |
| 2018/0164594 A1 | 6/2018 | Lee et al. |
| 2018/0196262 A1 | 7/2018 | Cage |
| 2018/0203240 A1 | 7/2018 | Jones et al. |
| 2018/0255285 A1 | 9/2018 | Hall et al. |

FOREIGN PATENT DOCUMENTS

| | | |
|---|---|---|
| EP | 3062280 A1 | 8/2016 |
| FR | 2911463 A1 | 7/2008 |
| JP | H06176131 A | 6/1994 |
| JP | H07275510 A | 10/1995 |
| JP | H07108346 B2 | 11/1995 |
| JP | H10-15252 | 1/1998 |
| JP | 2001062154 | 3/2001 |
| JP | 2003143478 A | 5/2003 |
| JP | 2005020559 A | 1/2005 |
| JP | 2005312685 A | 11/2005 |
| JP | 2006293604 A | 10/2006 |
| JP | 2007052484 A | 3/2007 |
| JP | 2010123128 A | 6/2010 |
| JP | 2012514391 A | 6/2012 |
| JP | 2012141461 A | 7/2012 |
| JP | 2012147905 A | 8/2012 |
| JP | 2013027479 A | 2/2013 |
| JP | 2015014792 A | 1/2015 |
| JP | 5790187 | 10/2015 |
| JP | 5801401 B2 | 10/2015 |
| JP | 2015228050 A | 12/2015 |
| JP | 5913346 B2 | 4/2016 |
| JP | 2016057947 A | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| JP | 2020513956 A | 5/2020 |
| RU | 2293587 | 2/2005 |
| RU | 2433487 | 2/2011 |
| RU | 2592458 C2 | 7/2016 |
| WO | 9316776 A1 | 9/1993 |
| WO | 1998031444 | 7/1998 |
| WO | 9851385 A1 | 11/1998 |
| WO | 2008059086 A1 | 5/2008 |
| WO | 2016023817 A2 | 2/2016 |
| WO | 2016075674 A2 | 5/2016 |
| WO | 2016204916 A1 | 12/2016 |

OTHER PUBLICATIONS

Jiejie Zhu et al: "Handling occlusions in video-based augmented reality using depth information", Computer Animation and Virtual Worlds, vol. 21, No. 5, pp. 509-521, XP055184802, Sep. 13, 2010.
Anonymous: "Head-up display—Wikipedia", XP055489840, retrieved from the Internet: URL:https://en.wikipedia.org/w/index.php?title=Head-up_display&oldid=766263622, pp. 2-3, Feb. 19, 2017.
Anonymous: "Head-mounted display—Wikipedia", XP055489914, retrieved from the Internet: URL:https://en.wikipedia.org/w/index.php?title=Head-mounted_display&oldid=767462464, pp. 1-3, Feb. 26, 2017.
Anonymous: "Augmented reality—Wikipedia", XP55488978, retrieved from the Internet: URL:https://en.wikipedia.org/w/index.php?title=Augmented_reality&oldid=768706789, pp. 3-4, Mar. 5, 2017.
PCT/US2018/020949 International Search Report and Written Opinion dated Jul. 23, 2018.
RU 2019131143 Search Report Feb. 3, 2020.
CN 201880016523.1 Office Action Jan. 2, 2020.
JP2019-548559 Office Action dated Mar. 30, 2020.
1 RU 2019131371 Office Action mailed Mar. 23, 2021.
Russian Office Action and Search Report for RU Application No. 2019131372, mailed Jul. 6, 2021, 9 pgs.
JP2019-548441 Office Action dated Nov. 8, 2021.
JP2019-548473 Office Action dated Jan. 17, 2022.
JP2019-548722 Office Action dated Jan. 19, 2022.
IN 201917033676 Office Action dated Jan. 18, 2022.
EP 18713478.8 Office Action dated Apr. 29, 2022.
Zhang Yanxia et al., "Look together: using gaze for assisting co-located collaborative search", Personal and Ubiquitous Computing, Sep. 26, 2016, pp. 173-186, vol. 21, No. 1, Springer Verlag, London, GB.
Jae-Young Lee et al., "Design and Implementation of an Augmented Reality System Using Gaze Interaction", Information Science and Applications (ICISA), Apr. 26, 2011, pp. 1-8, 2011 International Conference On, IEEE.

(56) References Cited

OTHER PUBLICATIONS

JP Office Action for Japanese Application No. 2019-548441 mailed Sep. 21, 2023.
JP Office Action for Japanese Application No. 2022-147654 mailed Oct. 26, 2023.
KR Office Action for Korean Application No. 2019-7029080 mailed Feb. 6, 2023.
CN Office Action for Chinese Application No. 201880016468.6 mailed Feb. 15, 2023.
CN Office Action for Chinese Application No. 201880016500.0 mailed Feb. 23, 2023.
CN Office Action for Chinese Application No. 201880016481.1 mailed Feb. 21, 2023.
JP Office Action for Japanese Application No. 2022-147654 mailed May 1, 2024.

\* cited by examiner

SYSTEMS AND METHODS FOR LAYERED VIRTUAL FEATURES IN AN AMUSEMENT PARK ENVIRONMENT

CROSS-REFERENCE TO RELATED APPLICATION

This application claims priority to and the benefit of U.S. Provisional Application No. 62/467,817 entitled "SYSTEMS AND METHODS FOR DIGITAL OVERLAY IN AN AMUSEMENT PARK ENVIRONMENT," filed Mar. 6, 2017, which is hereby incorporated by reference in its entirety for all purposes.

FIELD OF DISCLOSURE

The subject matter disclosed herein relates to systems and methods for providing augmented and virtual reality experiences to a user through the use of a wearable visualization device in coordination with a fixed visualization device.

BACKGROUND

Amusement parks and/or theme parks may include various entertainment attractions, restaurants, and rides useful in providing enjoyment to guests (e.g., families and/or people of all ages) of the amusement park. Areas of the amusement park may have different themes that are specifically targeted to certain audiences. For example, certain areas may include themes that are traditionally of interest to children, while other areas may include themes that are traditionally of interest to more mature audiences. Generally, locations having themes associated with such an amusement park may be referred to as an attraction or a themed attraction.

Themed attractions may be established using fixed equipment, building layouts, props, decorations, and so forth, most of which may generally relate to a certain theme. In situations where a different theme is to be established in the same location, the features associated with an older theme may be replaced with features associated with a newer theme. Depending on the complexity of the location's theme, this may prove to be very difficult and time-consuming as decorations, furniture, equipment, props, and so forth may be removed or replaced. Indeed, for certain types of attractions, relatively complex themes have become more common to provide guests with more immersive experiences.

It is now recognized that it is desirable to include attractions where it may be possible to change attraction themes, or to include or remove certain themed features in such attractions in a flexible and efficient manner relative to traditional techniques. It is also now recognized that it may be desirable to enhance the immersive experience of guests for such attractions, and to provide a more personalized or customized experience for guests.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for providing an augmented reality, a virtual reality, and/or a mixed reality experience to a user includes a first display and a second display. The user views a real-world environment through the first display and the second display. The system includes a wearable visualization device that includes the first display and a fixed visualization device that includes the second display. The first display is configured to display a first layer of virtual features and the second display is configured to display a second layer of virtual features. The system includes a processor configured to generate the first layer of virtual features and the second layer of virtual features. The processor is configured to operatively communicate with the wearable visualization device and the fixed visualization device to coordinate presentation of the first layer of virtual features and the second layer of virtual features.

In one embodiment, a system for providing an augmented reality, a virtual reality, and/or a mixed reality experience to a user includes a passenger ride vehicle, a fixed visualization device, and a processor. The passenger ride vehicle is configured to traverse a path or a track during a ride in an amusement park. The fixed visualization device includes a transparent display coupled to the passenger ride vehicle. The fixed visualization device is configured to overlay virtual features onto a real-world environment that is visible through the transparent display. The processor is configured to generate the virtual features and to coordinate presentation of the virtual features with ride effects of the ride.

In one embodiment, a method for providing an augmented reality, a virtual reality, and/or a mixed reality experience to a user includes generating a first layer of virtual features and a second layer of virtual features using a processor. The method also includes displaying at a first display time, in response to instructions from the processor, the first layer of virtual features on a first display. The first display is disposed within a wearable visualization device. The method further includes displaying at a second display time, in response to instructions from the processor, the second layer of virtual features on a second display. The second display is disposed within a fixed visualization device that is physically separate from the wearable visualization device.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
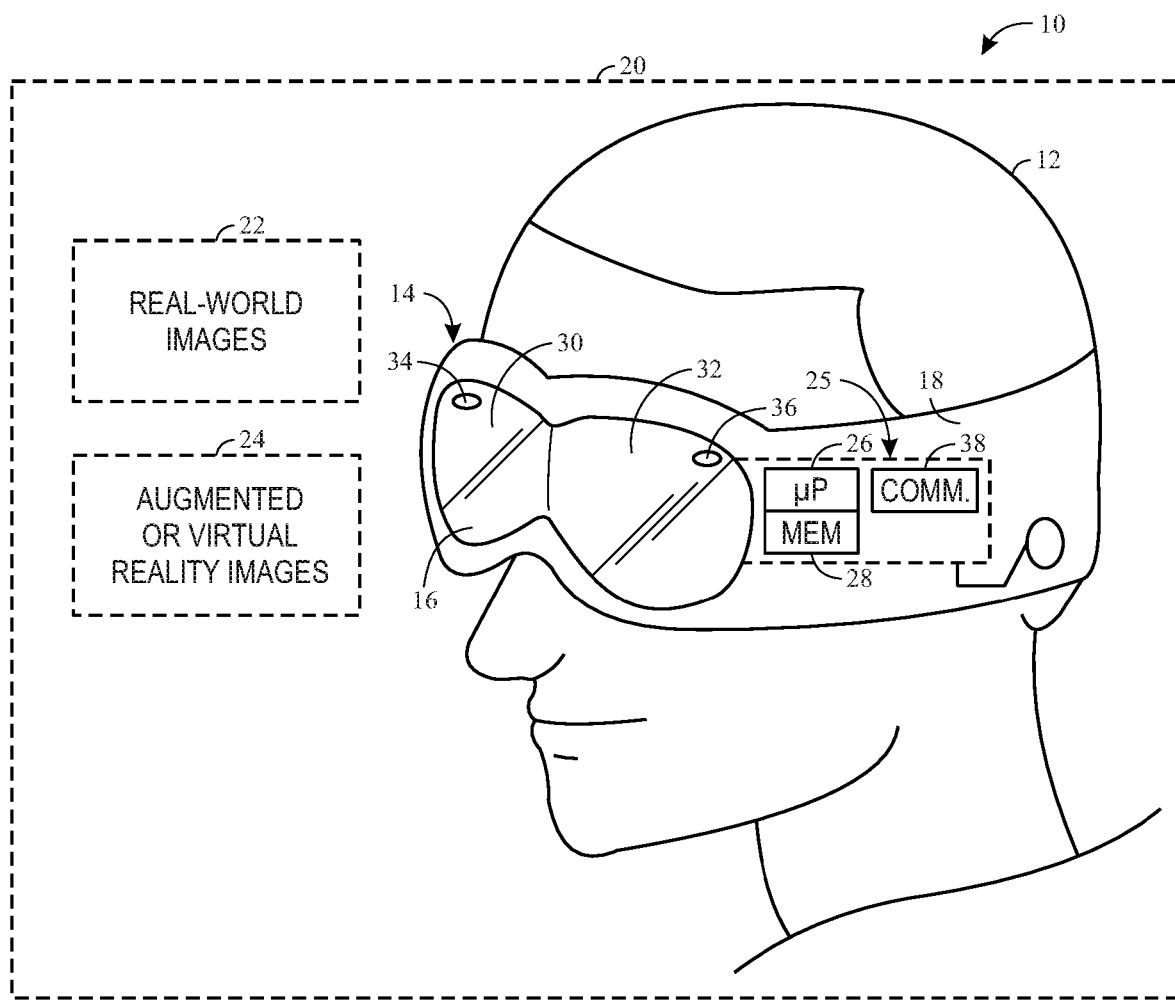
FIG. 1 is an illustration of an embodiment of a wearable visualization device and a computer graphics generation system that may be used in an augmented reality (AR) or virtual reality (VR) system, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an augmented reality (AR) experience, a virtual reality (VR) experience, a mixed reality (e.g., a combination of AR and VR) experience, or a combination thereof, as part of an attraction associated with an amusement park or theme park. In accordance with present embodiments, the attractions may not necessarily be limited to areas of an amusement park. Indeed, aspects of the present disclosure may also relate to the implementation of attractions in locations beyond the boundaries of an amusement park, such as in a hotel associated with the amusement park, or in vehicles that transport guests to and from the amusement park and/or hotel.

Present embodiments include, for example, combinations of certain hardware configurations, software configurations (e.g., algorithmic structures), as well as certain attraction features that may be utilized to implement AR, VR, and/or mixed reality experiences. Such experiences may provide an attraction-filled experience for guests of an amusement park which may be customizable, personalized, and interactive.

For example, present embodiments may include viewing devices such as wearable visualization devices (e.g., electronic goggles or displays, eyeglasses) and fixed visualization devices (e.g., transparent light emitting diode [LED] displays, transparent organic light emitting diode [OLED] displays) through which amusement park guests and employees may view AR, VR, and/or mixed reality scenes. It should be appreciated that the fixed visualization devices disclosed herein may be fixed and/or coupled to a structure, such as a passenger ride vehicle, a wall of a building, or the like. The fixed visualization devices may be physically separate and distinct from the wearable visualization devices. Certain implementations may be utilized to enhance guest experiences by, for instance, virtually removing or adding features in an environment associated with an amusement park, to provide adjustable virtual environments for different experiences in the same ride, to enable a guest to have the same viewpoint as another guest, and so forth.

Certain attractions within the amusement park may include passenger ride vehicles that may be specifically designed to cooperate with the viewing devices, such as to add additional depth and/or realism to the AR, VR, or mixed reality experience. In one embodiment, the fixed visualization devices may include transparent displays. In one embodiment, conventional panels and/or windows (e.g., glass, acrylic) of a cabin of the passenger ride vehicle may be replaced with the transparent displays that may augment scenery outside of the cabin by overlaying virtual images and/or videos onto portions or the entirety of the transparent displays (e.g., transparent LED displays, transparent OLED displays). For example, in one embodiment, the transparent displays may be used to display condensation as the passenger ride vehicle travels past an animated figure (e.g., a dragon) to create the illusion that the animated figure is breathing on the passenger ride vehicle.

Additionally or alternatively, the wearable visualization devices may be used to augment the passenger's perception of the environment. For example, the wearable visualization devices may create the illusion that the animated figure enters the cabin (e.g., the dragon reaches into or spits fire into the cabin), which may result in a more immersive experience for the guest. The fixed visualization devices and wearable visualization devices may be configured to operate independently, or may be operatively coupled through a controller (e.g., computer graphics generation system, one or more processors), which may synchronize and/or coordinate the visualizations displayed on the fixed visualization devices and the wearable visualization devices. The controller may also synchronize and/or coordinate the AR, VR, and/or mixed reality experience provided by the wearable visualization devices and/or the fixed visualization devices with external animatronics or other ride elements disposed about a track of the passenger ride vehicle.

Furthermore, certain data may be collected from the wearable visualization devices to enable more efficient use of computing power and/or other resources, for targeted advertising, to provide rare virtual features (e.g., "Easter eggs"), for triggering effects or adjusting a show, and so forth. For example, a ride control system may determine whether a passenger wearing the wearable visualization device has looked in a certain direction (e.g., to look at a virtual image on the fixed visualization device) before initiating movement of the ride or initiating other changes (e.g., changing the virtual image on the fixed visualization device). Employee visualization data may also be collected. For example, a ride control system may determine whether an employee operating a ride has looked in a certain direction (e.g., to confirm that no guests are entering a ride) before initiating movement of the ride. The visualization devices may also be used to function as a ride operator heads-up display (HUD).

To help illustrate, FIG. 1 depicts an embodiment of an AR/VR system 10 configured to enable a user 12 (e.g., a guest, an amusement park employee) to experience (e.g., view, interact with) controlled AR, VR, and/or mixed reality scenes. In accordance with certain embodiments, the user 12 may purchase or otherwise be provided a wearable visualization device 14, which may, in certain embodiments, include electronic eyeglasses 16 (e.g., AR/VR eyeglasses, goggles). As described in further detail below, the wearable visualization device 14 may include a wearable portion 18, illustrated as a headband, configured to house at least a portion of the electronic eyeglasses 16.

The wearable visualization device 14 may be used alone or in combination with other features to create a surreal environment 20, which may include an AR experience, a VR experience, a mixed reality experience, a computer-mediated reality experience, a combination thereof, or other similar surreal environment for the user 12. Specifically, the wearable visualization device 14 may be worn by the user 12 throughout the duration of a ride (e.g., a passenger ride vehicle) or another predetermined point such as during a game, at the entry of a particular area of an amusement park, during a ride to a hotel associated with the amusement park, at the hotel, and so forth.

In one embodiment, the wearable visualization device 14 may include a device in which certain virtual features may be overlaid onto a transparent surface (e.g., glasses), or may include a device in which virtual features are overlaid onto substantially real-time video, or a combination thereof (e.g., the wearable visualization device 14 may be capable of switching between transparent and opaque user 12 visualization). In one embodiment, the wearable visualization device 14 may include features, such as light projection features, configured to project light into one or both eyes of the user 12 so that the virtual features are superimposed over real world objects. Such a wearable visualization device 14 may be considered to include a retinal display.

Thus, in one embodiment, the user 12 may view the real world environment through a substantially transparent set of the electronic eyeglasses 16, with certain virtual features overlaid onto a surface of the electronic eyeglasses 16 (or the eyes of the user 12) so that the user 12 perceives that the virtual features are integrated into the physical environment. In one embodiment, the user 12 may view a real-time video of the physical environment having overlaid virtual features.

In one embodiment, in wearing the wearable visualization device 14, the user 12 may feel completely encompassed by the surreal environment 20 and may perceive the surreal environment 20 to be the real-world physical environment that includes certain virtual features. Specifically, in one embodiment, the wearable visualization device 14 may completely control the view of the user 12 (e.g., using opaque viewing surfaces) such that the surreal environment 20 may be a real-time video including real-world images 22 of the physical environment electronically merged with one or more augmented or virtual reality images 24 (e.g., virtual augmentations).

The real-world images 22 generally represent what that the user 12 would see, even when not wearing the wearable visualization device 14. The term "real-time" indicates that the images are obtained and/or provided in a timeframe substantially close to the time of actual observation. More specifically, in other embodiments, the wearable visualization device 14 may only partially control the view of the user 12 (e.g., using transparent viewing surfaces) such that the surreal environment 20 is the actual physical environment with the augmented or virtual reality images 24 overlaid onto the transparent surfaces, or onto the eyes of the user 12. In accordance with further embodiments of the present disclosure, the augmented or virtual reality images 24 may function to overlay a real-world object so that the object appears to no longer be present or deleted (e.g., the real-world object is fully or partially occluded with a virtual object or virtual environmental representation).

In one embodiment and as illustrated in the cutaway portion of the wearable visualization device 14, to support the creation of aspects of the surreal environment 20, the wearable visualization device 14 may include processing circuitry 25, such as a processor 26 and a memory 28. The processor 26 may be operatively coupled to the memory 28 to execute instructions for carrying out the presently disclosed techniques, for example generating real-world images 22 and/or one or more augmented or virtual reality images 24 (e.g., virtual features or images). These instructions may be encoded in programs or code stored in a tangible non-transitory computer-readable medium, such as the memory 28 and/or other storage. The processor 26 may be a general-purpose processor, system-on-chip (SoC) device, an application-specific integrated circuit (ASIC), or some other similar processor configuration. Together, the memory 28 and the processor 26 may form all or part of the AR/VR system 10.

In one embodiment, as further illustrated, the wearable visualization device 14 may also include a pair of displays 30 and 32 (e.g., which may be provided in the frame front of the wearable visualization device 14 where eyeglass lenses would otherwise appear) respectively corresponding to each eye of the user 12. In one embodiment, a unified display may be employed. The respective displays 30 and 32 may each include, by way of non-limiting example, transparent lenses onto which the augmented or virtual reality images 24 can be overlaid. In one embodiment, the displays 30 and 32 may be display surfaces and may include features (e.g., circuitry, light emitters) located adjacent to their respective peripheries configured to overlay the augmented or virtual reality images 24.

Additionally or alternatively, the displays 30 and 32 may include an opaque liquid crystal display (LCD), an opaque organic light emitting diode (OLED) display, or other similar display useful in displaying the real-world images 22 and the augmented or virtual reality images 24 to the user 12. In one embodiment, the respective displays 30 and 32 may each include a transparent (e.g., see-through) LED display or a transparent (e.g., see-through) OLED display useful in allowing, for example, the user 12 to view the augmented or virtual reality images 24 appearing on the respective displays 30 and 32 as an overlay to the actual and physical environment (e.g., an attraction associated with an amusement park or an interior of a passenger ride vehicle). Such a configuration may also enable the user 12 to view other layers of virtual images appearing on other displays, as discussed in more detail below.

Cameras 34 and 36 of the wearable visualization device 14 may respectively correspond to the point of view of the user 12, and may be used to capture real-time video data (e.g., live video) or ambient light signals of the physical environment. In one embodiment, a single camera may be employed. The wearable visualization device 14 may also include additional cameras to track the eye movement of the user, which may be particularly useful for embodiments where virtual features are projected directly into the eyes of the user 12. Communication features 38 (e.g., including a wireless transceiver) of the wearable visualization device 14 may transmit real-time data (e.g., video data, eye tracking data) captured via the respective cameras 34 and 36 to the processor 26 and/or a computer graphics generation system 40 for processing.

As depicted, the wearable visualization device 14 may be communicatively coupled to the computer graphics generation system 40 (e.g., a server within the amusement park) via a wireless network 42 (e.g., wireless local area networks [WLAN], wireless wide area networks [WWAN], near field communication [NFC]). However, in other embodiments, the real-time video data captured via the respective cameras 34 and 36 may be processed on the wearable visualization device 14 via the processor 26. Further, the communication features 38 (e.g., wireless transceiver, input/output connectors), which are connected to the processor 26, may enable firmware and/or software included on the processor 26 and memory 28 to be updated and/or configured for particular uses. In one embodiment, the wireless network 42 may communicatively couple all or some components of the AR/VR system 10.

Other features of the wearable visualization device 14 may transmit orientation data, position data, point of view data (e.g., focal length, orientation, pose), motion tracking data, and so forth obtained and/or derived based on data obtained via sensors of the wearable visualization device 14. Such sensors may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), and others.

In certain embodiments, features of the wearable visualization device 14 (e.g., geometric aspects or markings) may be monitored by a monitoring system 41 (e.g., one or more cameras) to determine position, location, orientation, and so forth of the wearable visualization device 14 and in turn, that of the user 12. The monitoring system 41 may be communicatively coupled to the computer graphics generation system 40 and used to identify position, location, orientation, and so forth of the user 12 (or multiple users).

The computer graphics generation system 40 includes processing circuitry 43, such as a processor 44 (e.g., general purpose processor or other processor) and a memory 46, and may process the real-time video data (e.g., live video), orientation and position data, point of view data, or any combination thereof, received from the wearable visualization device 14 and the monitoring system 41. Specifically, the computer graphics generation system 40 may use this data to generate a frame of reference to register the augmented or virtual reality images 24 to the physical environment, for example, to the generated real-world images 22. Specifically, using the frame of reference generated based on the orientation data, position data, point of view data, motion tracking data, and so forth, the graphics generation system 40 may then render a view of the augmented or virtual reality images 24, and in one embodiment the real-world images 22, in a manner that is temporally and spatially commensurate with what the user 12 would perceive if not wearing the wearable visualization device 14. The graphics generation system 40 may constantly update (e.g., in real-time) the rendering of the real-world images to reflect change in respective orientation, position, and/or motion of the respective user 12. In certain embodiments, the computer graphics generation system 40 may track such data corresponding to a plurality of users 12 (e.g., passengers of the passenger ride vehicle), where each user 12 (or at least some users 12) have a corresponding wearable visualization device 14.

As set forth above, the wearable visualization device 14 includes several components, and in general may include the electronic eyeglasses 16 configured to be worn on the head of the user 12. A variety of different configurations and implementations of the electronic eyeglasses 16 may be used, where the different configurations may have different sizes and shapes to better accommodate different sizes for different users 12, as well as different internal components (e.g., communication features, transducers, displays) to accommodate different implementations.

Figure 2:
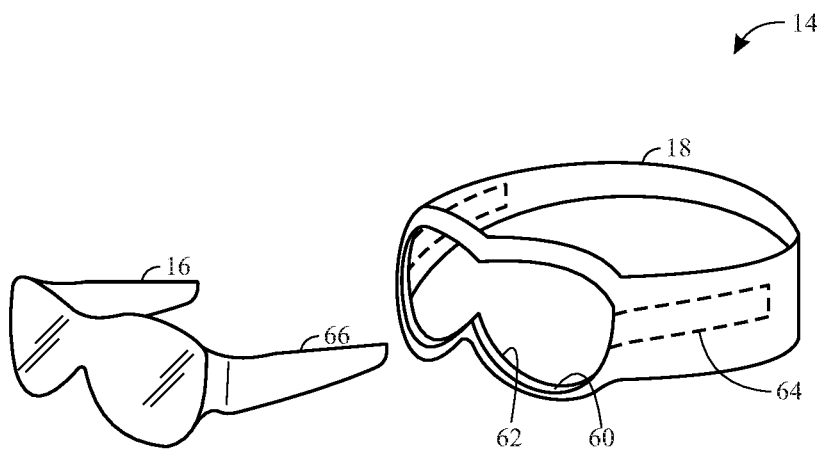
FIG. 2 is an exploded perspective view of an embodiment of the wearable visualization device of FIG. 1, in accordance with present embodiments.
Figure 3:
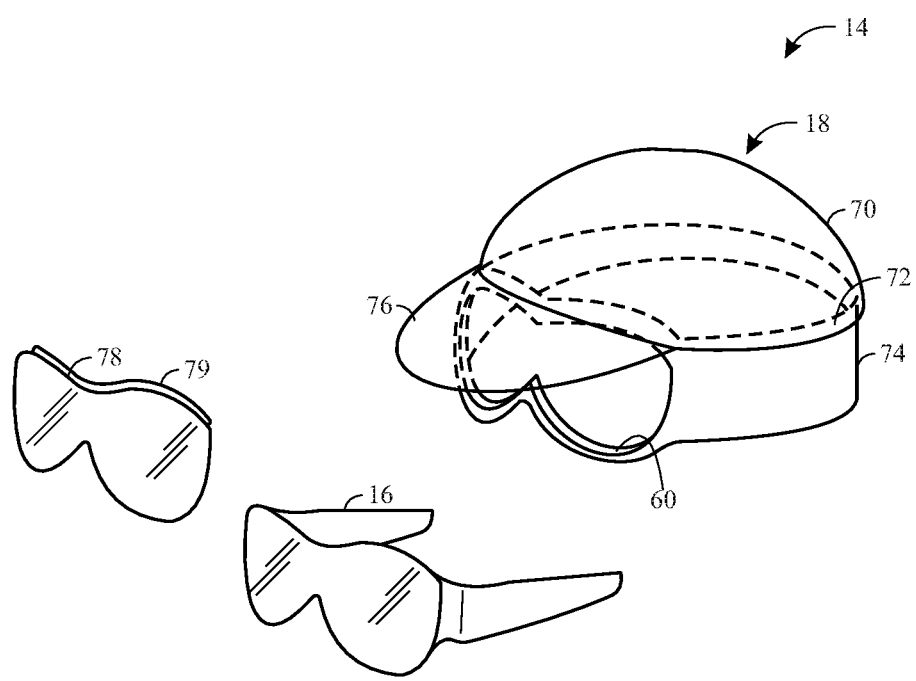
FIG. 3 is an exploded perspective view of an embodiment of the wearable visualization device of FIG. 1, in accordance with present embodiments.

To provide additional flexibility and support for the electronic eyeglasses 16, the wearable portion 18 of the wearable visualization device 14 may take a variety of forms, example embodiments of which are depicted in FIGS. 2 and 3. In FIG. 2, the wearable visualization device 14 includes a headband as the wearable portion 18. Such an embodiment of the wearable portion 18 may include various materials configured to accommodate movement of the user 12, while providing comfort (e.g., elastic materials, sweat wicking materials, padding) for the user 12. It is presently recognized that it may be desirable to have a separate wearable portion 18 and electronic eyeglasses 16 to enable the wearable portion 18 to be washed without risk to the processing circuitry 25 (FIG. 1) of the wearable visualization device 14. However, in certain implementations, the wearable portion 18 may incorporate one or more electronic components of the processing circuitry 25. In such embodiments, the electronic components in the wearable portion 18 may be substantially sealed away from the environment to avoid damage.

The embodiment of the wearable portion 18 of FIG. 2 includes a receptacle region 60 configured to receive the electronic eyeglasses 16, and to maintain the position of the electronic eyeglasses 16 relative to the eyes of the user 12 (FIG. 1) during use. In this regard, the receptacle region 60 may, in one embodiment, include a central portion 62 securable about the perimeter of the displays 30, 32 (FIG. 1) of the electronic eyeglasses 16, as well as side portions 64 configured to surround (e.g., partially or completely) arms 66 of the electronic eyeglasses 16.

The central portion 62 of the receptacle region 60 may include padding to allow for comfort of the user 12, while the headband provides adequate compressive force against the head of the user 12 (e.g., for maintenance of the position of the electronic eyeglasses 16). The central portion 62 may, in one embodiment, include one or more materials having a coefficient of friction against skin that provides an appropriate combination of stability and comfort. For example, gel materials commonly used in the nose region of electronic eyeglasses 16 may be appropriate.

As illustrated in the embodiment of FIG. 3, the wearable portion 18 may include other features either in addition to the headband, or in lieu of the headband. As depicted, the wearable portion 18 includes a cap 70 to be worn over the head of the user 12, as well as features similar to the headband set forth in FIG. 2. In certain embodiments and as shown, the cap 70 may include a securement region 72 where the cap 70 overlaps with a headband portion 74. The securement region 72 may include closure mechanisms such as hook-and-loop fasteners, hook-and-eye fasteners, buttons, magnetic strips, and so forth, configured to enable securement between the cap 70 and the headband portion 74. In this way, the cap 70 is separable from the headband portion 74, which allows them to be used separately, washed separately, and so forth. The headband portion 74, in one embodiment, may be integral with the cap 70 (e.g., sewn into the cap 70), such that the headband portion 74 is not readily removable from the cap 70.

The illustrated embodiment of the cap 70 includes a visor 76, which serves to shield the eyes of the user 12, as well as the electronic eyeglasses 16 and its associated displays 30, 32 (FIG. 1) from strong illumination sources such as the sun, overhead lighting, and so forth. The visor 76 may, for example, be particularly useful in embodiments where the displays 30, 32 operate based on optical reflection and/or are transparent or semi-transparent. In such embodiments, the visor 76 may assist in enhancing the perceived visual contrast of the augmented or virtual reality images 24 (FIG. 1) against a backdrop of the physical environment.

The illustrated embodiment of the wearable visualization device 14 of FIG. 3 also includes a display cover 78 configured to be placed over the displays 30, 32 (FIG. 1) of the electronic eyeglasses 16. The display cover 78 may provide shade for the displays 30, 32 to protect the displays 30, 32 from physical abuse, to provide a degree of opacity for enhanced contrast and visualization of the augmented or virtual reality images 24, for optical filtering, and so on. The display cover 78 may include any appropriate securement mechanism, such as a clip 79, configured to be removable and attach the display cover 78 to the electronic eyeglasses 16. Other securement features, such as a temporary adhesive and/or hook-and-loop fasteners may be used.

Figure 4:
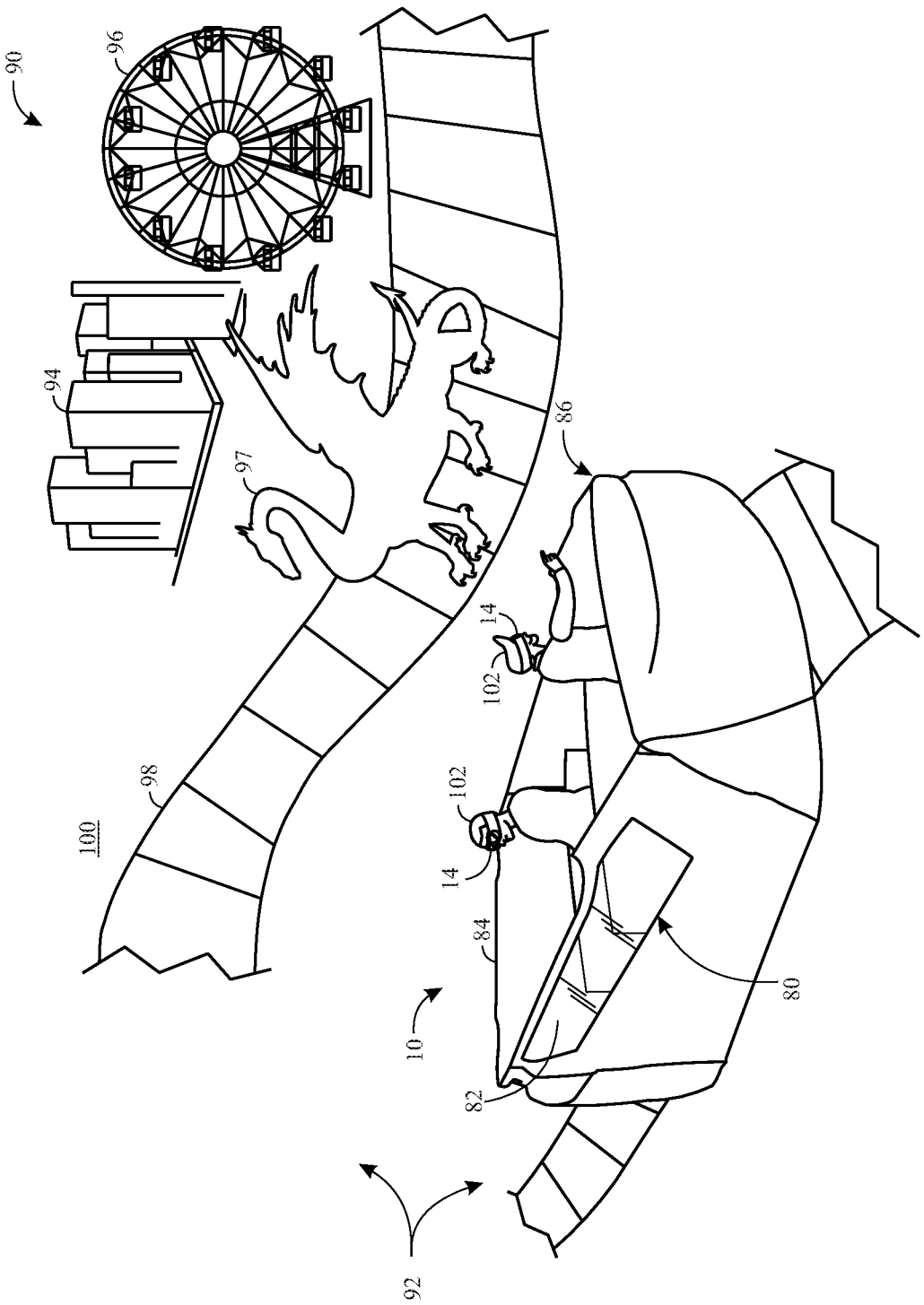
FIG. 4 is an illustration of a fixed visualization device and the wearable visualization device of the augmented reality (AR) or virtual reality (VR) system of FIG. 1, that may be used in a passenger ride vehicle, in accordance with present embodiments.

Turning now to FIG. 4, showing an embodiment of the AR/VR system 10 that may additionally include a fixed visualization device 80, which may be composed of one or more transparent displays 82. It should be appreciated that the fixed visualization device 80 disclosed herein may be fixed and/or coupled to a structure, such as a passenger ride vehicle 86, a wall of a building, or the like. The fixed visualization device 80 may be physically separate and distinct from the wearable visualization device 14. The fixed visualization device 80 may be used in lieu of, or in combination with, the wearable visualization device 14 of FIG. 1. As such, the transparent displays 82 may be used to substitute or enhance the AR, VR, and/or mixed reality experience generated by the wearable visualization device 14. In one embodiment, the fixed visualization device 80 may add an additional layer of augmented or virtual reality features that the user 12 may perceive.

In one embodiment, the transparent displays 82 may be coupled to a cabin 84 of the passenger ride vehicle 86. With the foregoing mind, it may be useful to first describe an embodiment of a setting in which the AR/VR system 10 may be used in an amusement park 90, as shown schematically in FIG. 4. As illustrated, the amusement park 90 may include a thrill ride 92, a mall of amusement park facilities 94 (e.g., game areas, hotels, restaurants, souvenir shops), and additional amusement attractions 96 (e.g., Ferris wheel, dark ride). In certain embodiments, the thrill ride 92 may include a rollercoaster or other similar thrill ride 92, and may thus further include a path, such as a system of closed-loop tracks 98 (e.g., miles of tracks 98) that are disposed about a surrounding physical environment 100 (e.g., the park facilities 94, the additional amusement attractions 96). The tracks 98 may be provided as an infrastructure on which the passenger ride vehicle 86 may traverse, for example, as a passenger 102 (e.g., the user 12 of FIG. 1) rides the thrill ride 92. Although only one passenger 102 is shown in the illustrated embodiment, the passenger ride vehicle 86 may be configured to house 1, 2, 3, 4, 5, or more passengers 102.

The tracks 98 may thus define the motion of the passenger ride vehicle 86. However, in one embodiment, the tracks 98 may be replaced by a controlled path, in which the movement of the passenger ride vehicle 86 may be controlled via an electronic system, a magnetic system, or other similar system infrastructure other than the tracks 98. In other words, the ride path of the passenger ride vehicle 86 may not be physically constrained to an exact path, thereby allowing the passenger 102 some degree of control over the motion path, view perspective, and so forth.

As the passenger ride vehicle 86 traverses the tracks 98, the passenger 102 may be provided a moving tour of the physical environment 100 in an area around or nearby the thrill ride 92. The passenger ride vehicle 86 may additionally move past robotic devices (e.g., animatronic figures 97) that may be configured to emulate a human or an animal, or bring lifelike characteristics to an otherwise inanimate object. The animatronic figures 97 may be disposed about portions of the track 98 and may be configured to interact with the passenger 102 (e.g., scare and/or surprise the passenger 102) as the passenger ride vehicle 86 traverses the tracks 98. The animatronic figures 97 may be powered by pneumatics, hydraulics, electric motors, or any additional means to actuate the animatronic figures 97. While the passenger 102 may find the thrill ride 92 to be a very enjoyable experience, it may be useful to enhance the ride experience of the passenger 102. Specifically, instead of having a physical view of only the physical environment 100, additional amusement attractions 96, and/or animatronic figures 97 disposed about the tracks 98, it may be useful to provide the passenger 102 with an additional AR, VR, or mixed reality experience. This may be done as the passenger ride vehicle 86 moves along the tracks 98 of the thrill ride 92, through the use of the wearable visualization device 14, the fixed visualization device 80, or both.

Figure 5:
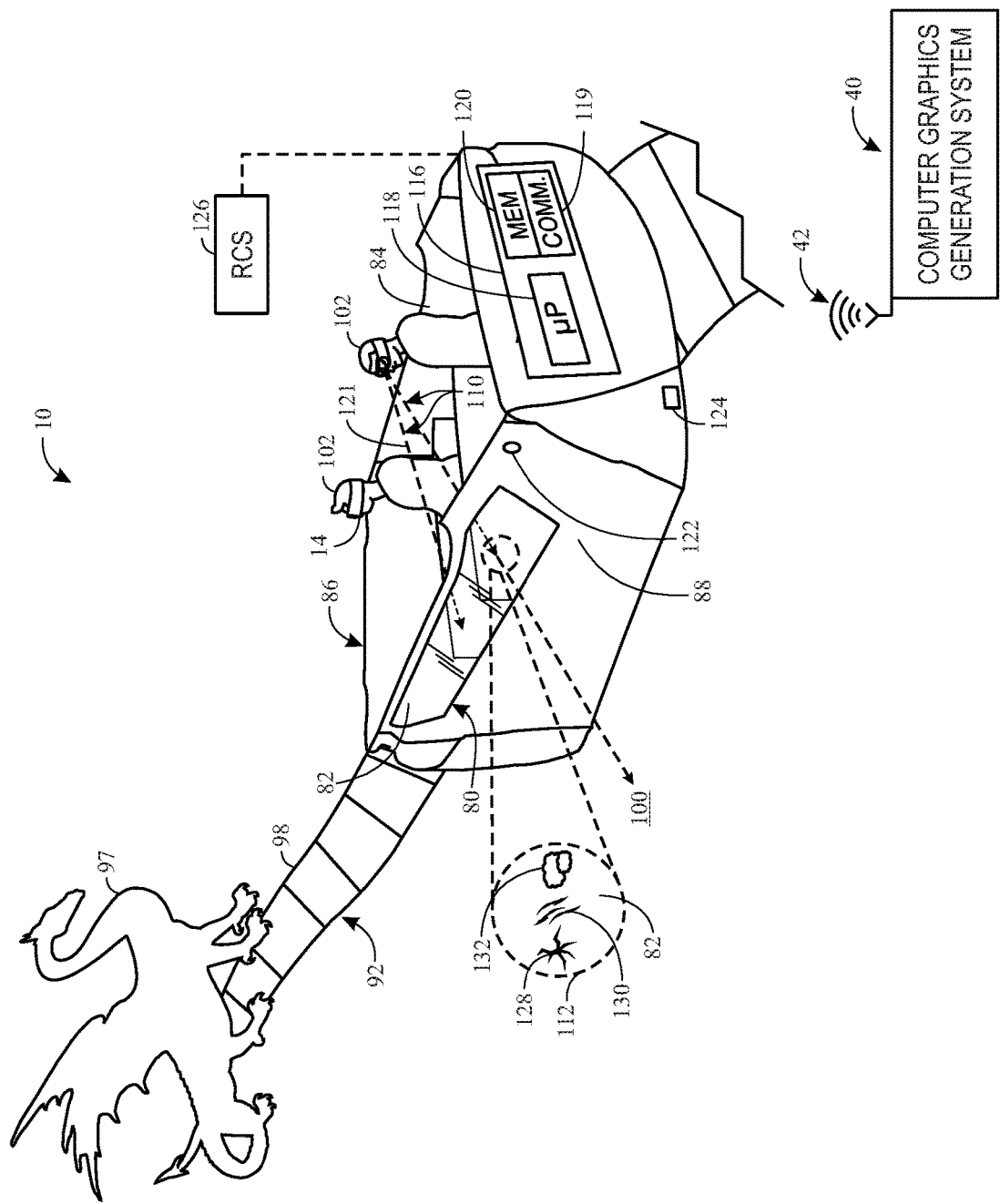
FIG. 5 is a perspective view of the passenger ride vehicle of FIG. 4, showing an embodiment of the augmented reality (AR) or virtual reality (VR) system having the fixed visualization device, in accordance with present embodiments.

FIG. 5 illustrates an embodiment of the AR/VR system 10 in which the passenger 102 may use the fixed visualization device 80. As set forth above, the transparent displays 82 of the fixed visualization device 80 may be transparent LED displays, transparent OLED displays, or any displays suitable for the application. The transparent displays 82 may be substantially and/or completely transparent when not energized. As such, in one embodiment, the transparent displays 82 may be integrated into a portion of the cabin 84, such as a side panel 88, which may create the illusion of a conventional window (e.g., glass window, acrylic window). Additionally or otherwise, the transparent displays 82 may be coupled to any portion of the passenger ride vehicle 86 (e.g., front, rear, roof, floor). Thus, the passenger 102 may view the physical environment 100 through the transparent displays 82 (e.g., such as through a conventional window). In one embodiment, the transparent displays 82 may be energized (e.g., continuously or periodically at certain times) to be substantially and/or completely opaque, which may create the illusion that the cabin 84 is completely encapsulated by solid walls or panels (e.g., lacking conventional windows).

In one embodiment, certain virtual features may be overlaid onto a surface of the transparent displays 82. The passenger 102 may view the physical environment 100 through one or more lines of sight 110, which may be created as the passenger 102 looks through the transparent displays 82. The transparent displays 82 may be used to overlay augmented or virtual reality images 112 onto the lines of sight 110 of the passenger 102. As such, the passenger 102 may perceive that the virtual features are integrated (e.g., physically present) within the physical environment 100. For example, the transparent displays 82 may only partially occlude the lines of sight 110 of the passenger 102 (e.g., using transparent viewing surfaces), such that the physical environment 100 the passenger 102 sees is the actual environment with the augmented or virtual reality images 112 overlaid onto the transparent viewing surfaces of the transparent displays 82. In one embodiment, the passenger 102 may view a real-time video of the physical environment 100 having overlaid virtual features on the transparent displays 82.

In one embodiment, the fixed visualization device 80 may be operatively coupled to processing circuitry 116, which may be coupled to the passenger ride vehicle 86. The processing circuitry 116 may include a processor 118 (e.g., general purpose processor or other processor), communication features 119 (e.g., wireless transceiver), and a memory 120. The processor 118 may be operatively coupled to the memory 120 to execute instructions for carrying out the presently disclosed techniques, for example, generating real-world images 121 (e.g., the real-time video of the physical environment 100) and/or the augmented or virtual reality images 112. These instructions may be encoded in programs or code stored in a tangible non-transitory computer-readable medium, such as the memory 120 and/or other storage. The processor 118 may be a general-purpose processor, system-on-chip (SoC) device, an application-specific integrated circuit (ASIC), or some other similar processor configuration. In one embodiment, the passenger 102 may view the augmented or virtual reality images 112 and the surrounding physical environment 100 through the transparent displays 82 as the passenger ride vehicle 86 traverses the tracks 98 of the thrill ride 92. The processing circuitry 116 may be communicatively coupled to the computer graphics generation system 40 (e.g., within the amusement park) via the communication features 119 and/or the wireless network 42. In one embodiment, the processing circuitry 116 may operate independently of the computer graphics generation system 40. As discussed in greater detail herein, the fixed visualization device 80 may be operatively coupled to the processor 26 (FIG. 1) of the wearable visualization device 14 (FIG. 1), thus enabling the augmented or virtual reality images 112 of the fixed visualization device 80 to be synchronized and/or coordinated with the augmented or virtual reality images 24 (FIG. 1) of the wearable visualization device 14.

In one embodiment, the real-time video data (e.g., live video data) may be received from cameras 122 coupled to the exterior of the passenger ride vehicle 86. Although only one camera 122 is pictured in the shown embodiment, the passenger ride vehicle 86 may support 1, 2, 3, 4, 5, or more cameras 122 to capture the real-world images 121 of the physical environment 100 surrounding the passenger ride vehicle 86. The processing circuitry 116 may process real-time video data to generate and display the real-world images 121 on the transparent displays 82. In one embodiment, the real-world images 121 may be pre-recorded and saved in the memory 120 of the processing circuitry 116. Additionally, the processing circuitry 116 may collect orientation and position data, point of view data, or any combination thereof received from the cameras 122 and/or additional sensor 124 that may be coupled to the passenger ride vehicle 86. Specifically, the processing circuitry 116 may use this data to generate a frame of reference, which may register and synchronize and/or coordinate the generated augmented or virtual reality images 112 to the real-world images 121 and/or the physical environment 100 that the passenger 102 may view through the lines of sight 110.

For example, the processing circuitry 116 may use the data collected by the cameras 122 and/or sensors 124 to generate real-world images 121 of the physical environment 100 onto the transparent displays 82. Specifically, using the frame of reference generated based on orientation data, position data, point of view data, motion tracking data, and so forth, the processing circuitry 116 may then render a view of the augmented or virtual reality images 112, and in one embodiment, the real-world images 121, in a manner that is temporally and spatially commensurate with what the passenger 102 would perceive if viewing the surrounding environment through a conventional window (e.g., glass window). The processing circuitry 116 may constantly update (e.g., in real-time) the rendering of the augmented or virtual reality images 112 and/or the real-world images 121 to reflect a change in respective orientation, position, and/or motion of the lines of sight 110 of the passenger 102.

Additionally or otherwise, the processing circuitry 116 may augment the physical environment 100 or the real-world images 121 of the physical environment 100 to enhance the ride experience of the passenger 102 (e.g., alter the physical environment 100 to match the theme of the track 98). For example, the transparent displays 82 may render rain drops or snowfall to augment the view of the physical environment 100 through the transparent displays 82. In one embodiment, the transparent displays 82 may partially or completely cover the view of the physical environment 100 with augmented or virtual reality images 112 of a fictional setting (e.g., jungle, outer space, etc.).

The processing circuitry 116 may control the timing of ride effects or elements (e.g., the animatronic figures 97), which may interact with the passenger 102. In one embodiment, the timing of ride effects may also be controlled by the computer graphics generation system 40, a separate ride control system 126, or a combination of both. The ride effects may be synchronized and/or coordinated with the augmented or virtual reality images 112 that are displayed on the transparent displays 82 as the passenger ride vehicle 86 traverses the tracks 98. The immersive experience of the thrill ride 92 may be enhanced for the passenger 102 by synchronizing and/or coordinating the ride effects with the augmented or virtual reality images 112.

The ride effects may be configured to interact with the passenger ride vehicle 86 as the passenger ride vehicle 86 traverses the tracks 98 of the thrill ride 92. For example, in one embodiment, the animatronic figures 97 may temporarily block the tracks 98 in front of the passenger ride vehicle 86, creating the illusion that the passenger ride vehicle 86 may collide with the animatronic figures 97. In one embodiment, the animatronic figure 97 (e.g., a dragon) may be configured to provide the illusion of attacking the passenger ride vehicle 86 (e.g., breathing fire in the direction of the passenger ride vehicle 86). While the passenger 102 may find the interaction with the animatronic figures 97 to be a very thrilling experience, in one embodiment, it may be useful to enhance the ride experience of the passenger through augmented or virtual reality images 112, which may be synchronized and/or coordinated with the movement of the animatronic figures 97.

For example, in one embodiment, the transparent displays 82 may overlay glass cracks 128 or damage 130 (e.g., discoloration or charring from the flames) onto the lines of sight 110 of the passenger 102. This may further enhance the realism of the animatronic figures 97 perceived by the passenger 102. In one embodiment, the transparent displays 82 may overlay condensation 132 (e.g., from breathing animals) onto the lines of sight 110, which may create an illusion in which the passenger 102 perceives the animatronic figures 97 to be in very close proximity to the passenger ride vehicle 86. Additionally or otherwise, any desirable augmented or virtual reality images 112 may be generated on the transparent displays 82, which may enhance the realism of special effects. For example, the augmented or virtual reality images 112 may include bug splatter, hail damage, and/or dust cover, which may enhance the realism of the thrill ride 92.

Figure 6:
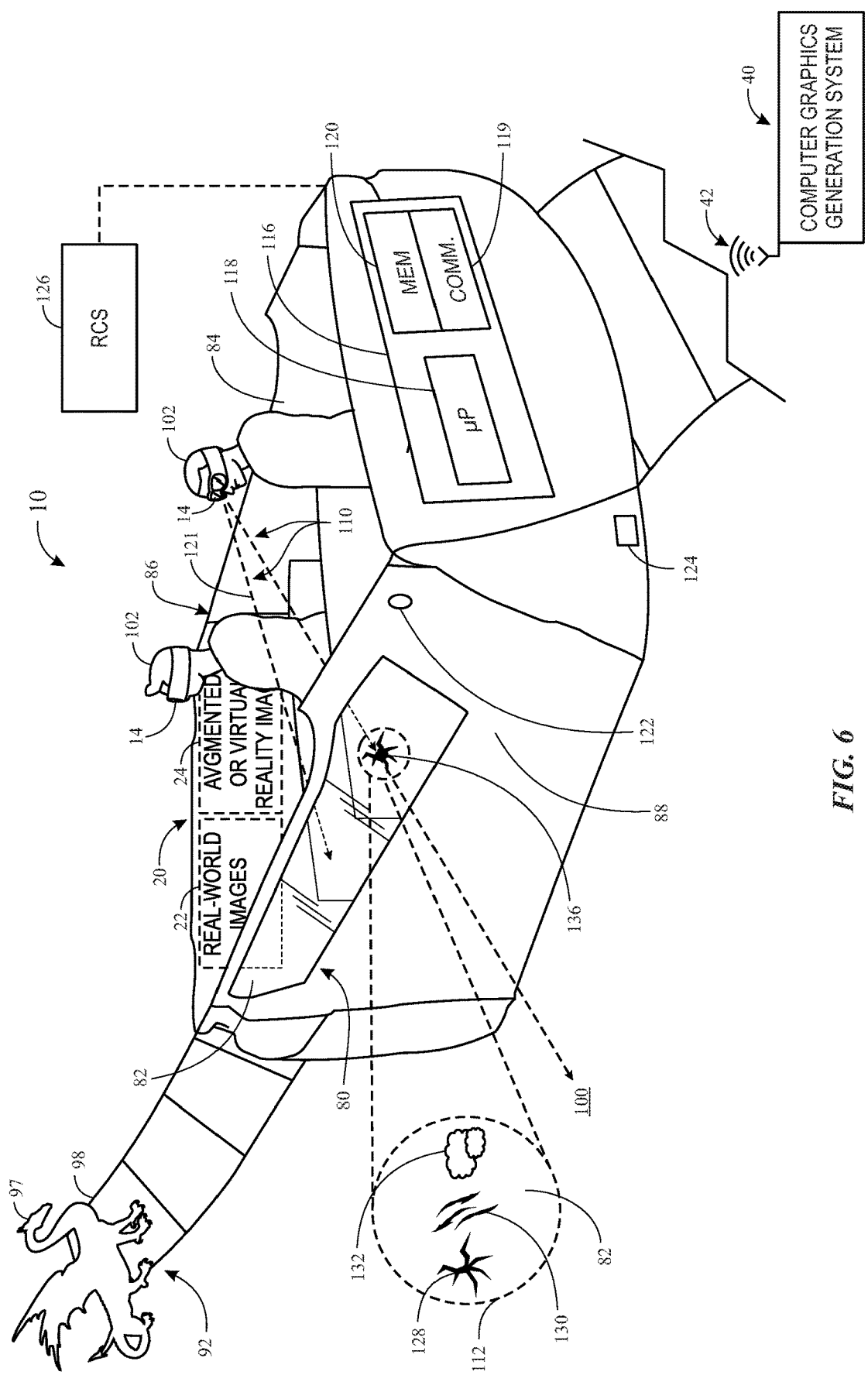
FIG. 6 is a perspective view of the passenger ride vehicle of FIG. 4, showing an embodiment of the augmented reality (AR) or virtual reality (VR) system having the wearable visualization device and the fixed visualization device, in accordance with present embodiments.

FIG. 6 illustrates an embodiment of the AR/VR system 10 in which the passenger 102 is concurrently using both the wearable visualization device 14 of FIG. 1 and the fixed visualization device 80 of FIG. 5. As set forth above, the wearable visualization device 14 may be used in conjunction with the fixed visualization device 80 to enhance the immersive AR, VR, and/or mixed reality experience of the passenger 102. For example, in one embodiment, the wearable visualization device 14 may be used to enhance the physical environment 100 within the cabin 84 by overlaying virtual features, such as the augmented or virtual reality images 24, onto the eyes of the passenger 102. As such, the wearable visualization device 14 may create the surreal environment 20 within the cabin 84 of the passenger ride vehicle 86. In one embodiment, the transparent displays 82 may enhance the physical environment 100 exterior to the cabin 84 by overlaying virtual features, such as the augmented or virtual reality images 112, onto the lines of sight 110 of the passenger 102. In this manner, the passenger 102 may view the augmented or virtual reality images 24 on the wearable visualization device 14 and the augmented or virtual reality images 112 on the transparent displays 82 of the fixed visualization device 80 simultaneously or in a coordinated manner. Alternatively, the wearable visualization device 14 may create the surreal environment 20 exterior the cabin 84 of the passenger ride vehicle 86. In this manner, the transparent displays 82 may overlay virtual features in a foreground and the wearable visualization device 14 may augment details in a background.

In one embodiment, the transparent displays 82 may show media, such as glass cracks 128, damage 130, and/or condensation 132, appearing to affect the exterior of the passenger ride vehicle 86. In one embodiment, the wearable visualization device 14 may additionally generate the illusion of media (e.g., such as moisture or condensation 132) entering the cabin 84 of the passenger ride vehicle 86. This may create multiple layers of virtual features within the AR experience, VR experience, mixed reality experience, computer-mediated reality experience, or combination thereof. Although only two layers are described in the illustrated embodiment, the AR/VR system 10 may be configured to generate 1, 2, 3, 4 or more layers of virtual features with which the passenger 102 may interact. For example, multiple transparent displays 82 may be coupled to the cabin 84 of the passenger ride vehicle 86 in sequential layers (e.g., stacked relative to one another), such that each transparent display 82 may generate a layer of virtual features.

For example, the passenger 102 may look through the electronic eyeglasses 16 (FIG. 1) of the wearable visualization device 14, which may generate a first layer of virtual features (e.g., the augmented or virtual reality images 24). The passenger 102 may additionally view the transparent displays 82 of the fixed visualization device 80 (e.g., through the electronic eyeglasses 16 of the wearable visualization device 14), which may create a second layer of virtual features (e.g., the augmented or virtual reality images 112). The AR/VR system 10 may be configured to generate the first layer of virtual features, the second layer of virtual features, an additional layer of virtual features, or any combination thereof to create the AR, VR, and/or mixed reality experience for the passenger 102.

As such, in one embodiment, the AR/VR system 10 may alter the surrounding physical environment 100 (e.g., the amusement park 90) perceived by the passenger 102 through augmented or virtual reality images 112 generated by the fixed visualization device 80 and the AR/VR system 10 may create the surreal environment 20 within the cabin 84 through the use of the wearable visualization device 14. In one embodiment, the wearable visualization device 14 may additionally alter the surrounding physical environment 100 either in combination with, or in lieu of, the transparent displays 82.

The augmented or virtual reality images 24 and/or 112 of the wearable visualization device 14 and the fixed visualization device 80, respectively, may be synchronized and/or coordinated by the processor 26 (FIG. 1) of the wearable visualization device 14, the processor 44 (FIG. 1) of the computer graphics generation system 40, the processor 118 of the fixed visualization device 80, an additional external processor (e.g., such as in the ride control system 126), or any combination thereof. Synchronization and/or coordination may involve adjusting the frame of reference of the virtual features based on the orientation data, position data, point of view data, motion tracking data, or additional data collected by the AR/VR system 10.

The processors 26, 44, 118, or any combination thereof, may communicate via the wireless network 42 and may additionally synchronize and/or coordinate the augmented or virtual reality images 24 and/or 112 to the ride effects (e.g., the animatronic figures 97). In one embodiment, a separate computer synchronization system (e.g., the ride control system 126) may be used to synchronize and/or coordinate the augmented or virtual reality images 24 and/or 112 and the ride effects.

In one embodiment, the processing circuitry 116 of the fixed visualization device 80 may offload a portion of the processing power that may be required by the processing circuitry 25 (FIG. 1) of the wearable visualization device 14. The processing circuitry 116 of the fixed visualization device 80 may have less spatial constraints than the processing circuitry 25 of the wearable visualization device 14. This may enable the processing circuitry 116 of fixed visualization device 80 to implement a larger and/or more powerful processor 118. As such, the transparent displays 82 may generate and display the majority of the augmented or virtual reality images 112 required during the thrill ride 92, while the wearable visualization device 14 may only generate smaller details (e.g., create the surreal environment 20 within the cabin 84).

In addition, the fixed visualization device 80 may render certain virtual features more efficiently than the wearable visualization device 14. For example, it may be desirable to create the illusion that the animatronic figure 97 imparts a feature 136 (e.g., punctures a hole) onto the window of the cabin 84 of the passenger ride vehicle 86, as part of a special effect of the thrill ride 92. In one embodiment, the fixed visualization device 80 may be used to create the illusion that the feature 136 has been imparted onto the window (e.g., the transparent display 82) of the cabin 84. In order for such features 136 to be provided via the wearable visualization device 14, the wearable visualization device 14 may need to continuously intake real-world images 22 and/or update the position of the feature 136 on the electronic glasses 16, which may require substantial processing power. For example, in order ensure that the feature 136 remains stationary (e.g., the hole does not move with respect to cabin 84 window) as the point of view of the passenger 102 changes (e.g., the passenger 102 turns or moves relative to the window), the wearable visualization device 14 may need to continuously intake real-world images 22 and/or update the position of the feature 136 on the electronic eyeglasses 16. In such cases, providing the feature 136 via the fixed visualization device 80 may be more efficient.

In one embodiment, the AR/VR system 10 may instead provide the feature 136 on the transparent display 82. In one embodiment, the AR/VR system 10 may use the electronic eyeglasses 16 to overlay augmented or virtual reality images 24 of details that may be related to the feature 136 (e.g., a glass shard originating from the hole in the window), onto the eyes of the passenger 102, such that the details may appear at an appropriate position relative to the feature 136. As such, in one embodiment, the wearable visualization device 14 may only generate smaller augmented or virtual reality images 24 (e.g., details, such as the glass shard), while the fixed visualization device 80 may generate the majority of the augmented or virtual reality images 112, including features that remain stationary relative to the passenger ride vehicle 86 (e.g., the features 136, such as the hole). In operation, the passenger 102 may view the interior of the cabin 84 and the feature 136 generated by the transparent displays 82 though the substantially transparent electronic eyeglasses 16 (FIG. 1). As such, the position of the feature 136 in relation to the window (e.g., the transparent displays 82) of the passenger ride vehicle 86 may remain constant, regardless of the orientation and/or point of view of the passenger 102. This may substantially reduce the processing power required by the wearable visualization device 14 as compared to using the wearable visualization device 14 to generate features such as the feature 136. Thus, the combination of the wearable visualization device 14 and the fixed visualization device 80, and the coordination of these devices 14, 80 by the AR/VR system 10, provides a more dynamic and efficient system that overcomes problems with using the wearable visualization device 14 alone to create the AR, VR, and/or mixed reality experience for the passenger 102.

In one embodiment, the augmented or virtual reality images 24 generated by the wearable visualization device 14 and the augmented or virtual reality images 112 generated by the fixed visualization device 80 are synchronized and/or coordinated as the passenger ride vehicle 86 traverses the thrill ride 92, such that the virtual features experienced by the passenger 102 may be perceived as more realistic than when using either the wearable visualization device 14 or the fixed visualization device 80 alone. For example, an animated feature (e.g., an explosion) may be incorporated as part of the theme of the thrill ride 92. The animated feature may first be generated by the transparent displays 82 and overlaid onto the surrounding physical environment 100 viewed by the passenger 102. The transparent displays 82 may next generate the illusion of features, such as the crack 128 within the window (e.g., the transparent displays 82), and may subsequently generate the illusion that the window shatters (e.g., creating glass shards). The wearable visualization device 14 may next generate the illusion of debris (e.g., the glass shards) floating through the cabin 84 of the passenger ride vehicle 86. As such, the wearable visualization device 14 and the fixed visualization device 80 may create the multi-layered augmented or virtual reality experience for the passenger 102.

Figure 7:
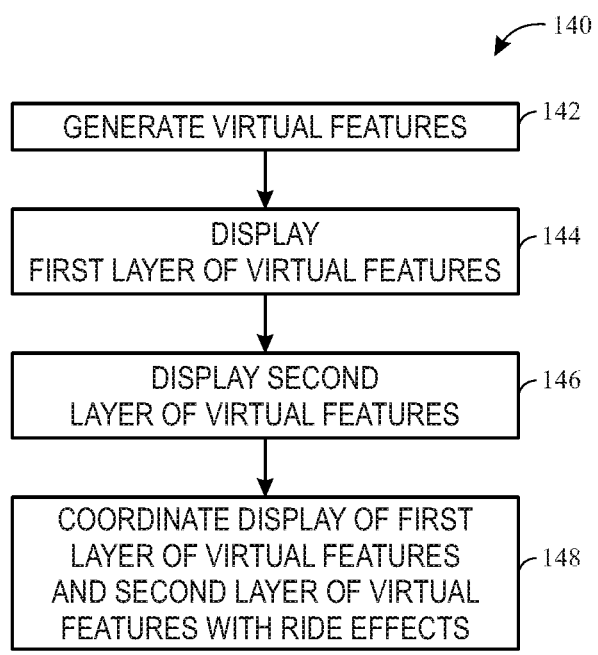
FIG. 7 is a flowchart of a method of operation of the augmented reality (AR) or virtual reality (VR) system of FIG. 4, in accordance with present embodiments.

FIG. 7 illustrates a flow diagram of an embodiment of a process 140 to provide AR/VR enhancements to amusement park guests (e.g., the passenger 102). The process 140 may be useful in creating the AR experience, VR experience, and/or mixed reality experience during an amusement park experience, such as the thrill ride 92. The process 140 may be representative of initiated code or instructions stored in a non-transitory computer-readable medium (e.g., the memory 28, 46, 120) and executed, for example, by the processor 26 of the wearable visualization device 14, the processor 44 of the computer graphics generation system 40, and/or the processor 118 of the fixed visualization device 80. The processors 26, 44, and/or 118 may be communicatively coupled via a network, such as the wireless network 42, to receive and send the instructions described below.

The process 140 may begin with block 142, generating AR/VR enhancements (e.g., virtual features), such as the augmented or virtual reality images 24, 112. The AR/VR enhancements may be provided by the wearable visualization device 14, the fixed visualization device 80, an additional visualization device, or any combination thereof. The AR/VR enhancements may be generated by the processing circuitry 25 of the wearable visualization device 14, the computer graphics generation system 40, the processing circuitry 116 of the fixed visualization device 80, or any combination thereof.

In one embodiment, the wearable visualization device 14 may include transparent or semi-transparent display surfaces (e.g., the displays 30, 32) and project augmented or virtual reality images 24 into the eyes of the passenger 102. Additionally or alternatively, as discussed in greater detail below, the fixed visualization devices 80 may also be configured to include transparent or semi-transparent display surfaces (e.g., the transparent displays 82) that display the augmented or virtual reality images 112 onto the lines of sight 110 of the passenger 102. For example, the augmented or virtual reality images 112 may occlude a portion of the lines of sight 110 of the passenger 102 (e.g., the passenger 102 may still see portions of the physical environment 100 through the transparent displays 82), creating the illusion that the augmented or virtual reality images 112 are part of the physical environment 100.

Turning now to block 144, the process 140 may include a step, or series of steps, in which the wearable visualization device 14 may overlay or superimpose (e.g., via the displays 30, 32) one or more augmented or virtual reality images 24 onto the physical environment 100 to generate the first layer of virtual features to be viewed by the passenger 102. For example, the processors 26, 44, 118, may overlay or superimpose the augmented or virtual reality images 24 onto the transparent or semi-transparent display surfaces (e.g., the displays 30, 32) through which the passenger 102 may view the physical environment 100, thus generating the first layer of virtual features. In one embodiment, the passenger 102 may view the physical environment 100 through transparent portions of the displays 30, 32 while the wearable visualization device 14 may only occlude a portion of the displays 30, 32 with the augmented or virtual reality images 24. In one embodiment, the processors 26, 44, 118 may generate and/or overlay augmented or virtual reality images onto the video data stream of the real-world images 22 (e.g., facilities 94, physical environment 100) using one or more video merging and/or optical merging techniques.

Turning now to block 146, the process 140 may include a step, or series of steps, in which the fixed visualization device 80 may overlay or superimpose (e.g., via the transparent displays 82) one or more augmented or virtual reality images 112 onto the physical environment 100 to generate the second layer of virtual features to be viewed by the passenger 102. For example, the processors 26, 44, 118, may overlay or superimpose the augmented or virtual reality images 112 onto the transparent or semi-transparent display surfaces (e.g., the transparent displays 82) through which the passenger 102 may view the physical environment 100, thus generating the second layer of virtual features. In one embodiment, the passenger 102 may view the physical environment 100 through transparent display 82 while the fixed visualization device 80 may only occlude a portion of the transparent display 82 with the augmented or virtual reality images 112. In one embodiment, the processors 26, 44, 118 may generate and overlay augmented or virtual reality images 112 onto the video data stream of the real-world images 121 (e.g., facilities 94, physical environment 100) using one or more video merging and/or optical merging techniques. In any case, the wearable visualization device 14 may generate the first layer of virtual features (e.g., via the augmented or virtual reality images 24) and the fixed visualization device 80 may generate the second layer of virtual features (e.g., via the augmented or virtual reality images 112). Additionally or otherwise, the AR/VR system 10 may be configured to generate 1, 2, 3, 4, or more layers of virtual features.

Turning now to block 148, the process 140 may also include coordinating the display of the first layer of virtual features and the second layer of virtual features. The first layer of virtual features and the second layer of virtual features may be synchronized and/or coordinated by the processors 26, 44, and/or 118 to enhance the immersive experience and realism of the virtual effects perceived by the passenger 102 of the thrill ride 92. In one embodiment, image data from cameras other than those located on the wearable visualization device 14 or the passenger ride vehicle 86 may serve to facilitate synchronization and/or coordination between the first layer of virtual features and the second layer of virtual features. Such synchronization and/or coordination may be useful for triangulation of the position of the passenger 102 based on the known position of certain fixed features (e.g., certain attraction locations), for timing of certain special effects (e.g., real, augmented, or simulated fireworks or explosions), and other effects described below.

In one embodiment, the processors 26, 44, 118 may receive and analyze real-time captured data, such as image data, positional data, and/or inputs from other electronic devices. For example, with respect to image data, the processors 26, 44, 118 may receive real-time video data (e.g., live video) captured via the cameras 34, 36, 122 of the wearable visualization device 14 and/or the passenger ride vehicle 86. In one embodiment, the video may be used for the generation of the real-world images 22 and 121 that may be displayed on the electronic eyeglasses 16, or the transparent displays 82, respectively. For example, the processors 26, 44, 118 may generate a video data stream of the physical environment 100 (e.g., a region of the amusement park 90) to be displayed on the displays 30, 32 of the wearable visualization device 14 and/or the transparent displays 82 of the fixed visualization device 80.

In one embodiment, the processors 26, 44, 118 may render the first layer of virtual features and the second layer of virtual features based on any one or a combination of factors. Such factors may include the position or location of the passenger ride vehicle 86 along the tracks 98 (e.g., or other location when the tracks 98 are not present) at any given time point during a cycle of the thrill ride 92, a predetermined distance traveled by the passenger ride vehicle 86 during a cycle of the thrill ride 92, after a predetermined lapse of time, or after one or more actions have been performed by the passenger 102 of the passenger ride vehicle 86.

In other embodiments, the wearable visualization device 14, the computer graphics generation system 40, and/or the fixed visualization device 80 may perform one or more geometric or photometric recognition algorithms on the video or image data captured via the cameras 34, 36, 122 to determine the points of location of the passenger 102 and/or the passenger ride vehicle 86. The wearable visualization device 14, the computer graphics generation system 40, and/or the fixed visualization device 80 may also use this data to control the timing of the augmented or virtual reality images 24, 112 with respect to ride effect (e.g., the animatronic figures 97) to synchronize and/or coordinate the first layer of virtual features and the second layer of virtual features with the ride effect.

While certain embodiments relate to use of the wearable visualization device 14 and/or the fixed visualization device 80 in the context of the thrill ride 92, it should be appreciated that the AR/VR system 10 may be used outside of the thrill ride 92 and in any of a variety of environments. For example, the transparent displays 82 may be coupled to a wall to portray windows of a room, and the user 12 (e.g., the passenger 102) may wear the electronic eye glasses 16 as the user 12 sits in and/or traverses the room to provide an immersive experience in the manner disclosed herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for providing an augmented reality, a virtual reality, and/or a mixed reality experience to a user in a passenger ride vehicle, wherein the system is configured to enable the user to view a real-world environment through a first display and a second display, the system comprising:
  a wearable visualization device configured to be worn by the user in the passenger ride vehicle and comprising the first display, wherein the first display is configured to display a first layer of virtual features to overlay the first layer of virtual features onto the real-world environment viewable by the user;
  a fixed visualization device coupled to the passenger ride vehicle and comprising the second display, wherein the second display is configured to display a second layer of virtual features to overlay the second layer of virtual features onto the real-world environment viewable by the user; and
  a processor configured to generate the first layer of virtual features at a first display time and the second layer of virtual features at a second display time that precedes the first display time, wherein the processor is configured to operatively communicate with the wearable visualization device and the fixed visualization device to coordinate presentation of the first layer of virtual features and the second layer of virtual features with the real-world environment, such that the second layer of virtual features provides a visual illusion of a special effect occurring at an exterior of the passenger ride vehicle, and the first layer of virtual features provides an additional visual illusion of an animated effect related to the special effect and occurring at an interior of the passenger ride vehicle, wherein the special effect comprises an explosion, and the animated effect comprises debris related to the explosion.

2. The system of claim 1, wherein the first display is a first transparent or semi-transparent display and is configured to enable the user, when wearing the wearable visualization device, to view the second display through the first display, and wherein the second display is a second transparent or semi-transparent display.

3. The system of claim 1, wherein the passenger ride vehicle is configured to travel along a path through an amusement park, wherein the real-world environment comprises elements of an attraction of the amusement park surrounding the passenger ride vehicle, and wherein the elements are viewable by the user through the first display and the second display.

4. The system of claim 3, wherein the processor is configured to coordinate the presentation of the first layer of virtual features and the second layer of virtual features with the elements associated with the attraction.

5. The system of claim 1, wherein the first layer of virtual features comprises a respective virtual image of a first object within the interior of the passenger ride vehicle.

6. The system of claim 5, wherein the first layer of virtual features comprises a respective virtual image of an additional object at the exterior of the passenger ride vehicle.

7. The system of claim 1, comprising one or more cameras or one or more sensors configured to monitor the real-world environment to facilitate coordination of the presentation of the first layer of virtual features and the second layer of virtual features with the real-world environment, wherein at least one camera of the one or more cameras or at least one sensor of the one or more sensors is coupled to the passenger ride vehicle of an amusement park attraction.

8. The system of claim 1, wherein the first display is configured to overlay the first layer of virtual features onto the second layer of virtual features and the real-world environment to enable the user to simultaneously view both the first layer of virtual features and the second layer of virtual features in stacked layers that are overlaid onto the real-world environment.

9. The system of claim 1, wherein the first layer of virtual features is depicted as non-stationary relative to the first display of the wearable visualization device and the second layer of virtual features is depicted as stationary relative to the second display of the fixed visualization device.

10. A system for providing an augmented reality, a virtual reality, and/or a mixed reality experience to a user, wherein the system is configured to enable the user to view a real-world environment through a first transparent display and a second transparent display, the system comprising:
a passenger ride vehicle configured to traverse a path during a ride in an amusement park;
a wearable visualization device configured to be worn by the user within the passenger ride vehicle during the ride, wherein the wearable visualization device comprises the first transparent display, and the first transparent display is configured to overlay a first layer of virtual features onto the real-world environment viewable by the user;
a fixed visualization device coupled to the passenger ride vehicle and comprising the second transparent display, wherein the second transparent display is configured to overlay a second layer of virtual features onto the real-world environment viewable by the user; and
a processor configured to generate the first layer of virtual features at a first display time and to generate the second layer of virtual features at a second display time that precedes the first display time to coordinate presentation of the first layer of virtual features and presentation of the second layer of virtual features with each other and with ride effects of the ride, wherein the second layer of virtual features provides a visual illusion of damage at an exterior of the passenger ride vehicle during a portion of a ride cycle and the first layer of virtual features provides an additional visual illusion of debris related to the damage during the portion of the ride cycle.

11. The system of claim 10, wherein the processor is configured to coordinate the presentation of the first layer of virtual features with the presentation of the second layer of virtual features based on a position of the passenger ride vehicle along the path.

12. The system of claim 10, wherein the processor is configured to coordinate the presentation of the first layer of virtual features and the presentation of the second layer of virtual features with the ride effects by instructing the first transparent display to overlay the first layer of virtual features at a predetermined time during a ride cycle of the ride and instructing the second transparent display to overlay the second layer of virtual features at the predetermined time during the ride cycle of the ride.

13. The system of claim 10, wherein the first layer of virtual features comprises a respective virtual image of shards floating through a cabin of the passenger ride vehicle and the second layer of virtual features comprises a respective virtual image of cracks formed on a window of the cabin.

14. The system of claim 10, wherein the second transparent display is configured to be opaque when energized, thereby providing an illusion that a cabin of the passenger ride vehicle is enclosed by solid walls.

15. The system of claim 10, wherein the first layer of virtual features provides the additional visual illusion of the debris in an interior of the passenger ride vehicle.

16. A method for providing an augmented reality, a virtual reality, and/or a mixed reality experience to a user, the method comprising:
generating, using a processor, a first layer of virtual features and a second layer of virtual features;
displaying at a first display time, in response to instructions from the processor, the first layer of virtual features on a first display, wherein the first display is disposed within a wearable visualization device configured to be worn by a user in a passenger ride vehicle; and
displaying at a second display time that precedes the first display time, in response to instructions from the processor, the second layer of virtual features on a second display, wherein the second display is disposed within a fixed visualization device that is physically separate from the wearable visualization device and is coupled to the passenger ride vehicle, wherein the first display is configured to overlay the first layer of virtual features onto the second layer of virtual features displayed by the second display to enable the user to simultaneously view both the first layer of virtual features and the second layer of virtual features in stacked layers overlaid onto a real-world environment viewable by the user through the first display and the second display, and wherein the processor is configured to coordinate presentation of the first layer of virtual features and the second layer of virtual features to provide a visual illusion of damage at an exterior of the passenger ride vehicle via the second layer of virtual features at the second display time and to subsequently provide an additional visual illusion of debris related to the damage at the first display time.

17. The method of claim 16, wherein the first layer of virtual features comprises a first virtual image of a first object within a cabin of the passenger ride vehicle, the second layer of virtual features comprises a second virtual image of a second object positioned external to the passenger ride vehicle or on a window of the passenger ride vehicle.

18. The method of claim 16, wherein the passenger ride vehicle travels along a path of a ride in an amusement park, and wherein the first display time and the second display time result in a coordinated display of the first layer of virtual features and the second layer of virtual features with each other and with an animated figure along the path of the ride to provide the visual illusion of the damage being caused by the animated figure.

19. The method of claim 16, comprising receiving, at the processor, signals indicative of the real-world environment from one or more cameras, wherein the processor utilizes the signals to determine the first display time and the second display time to facilitate coordination of presentation of the first layer of virtual features and the second layer of virtual features with elements in the real-world environment.

* * * * *